United States Patent
Rich et al.

[15] 3,692,744
[45] Sept. 19, 1972

[54] INJECTION MOLDED BRANCHED POLYESTERS

[72] Inventors: Rene Rich; Yves Vaginay, both of Lyon, France

[73] Assignee: Societe Rhodiaceta, Paris, France

[22] Filed: Sept. 11, 1970

[21] Appl. No.: 71,330

[30] Foreign Application Priority Data
Jan. 4, 1968   France.....................134,897

Related U.S. Application Data

[62] Division of Ser. No. 717,415, March 29, 1968, abandoned.

[52] U.S. Cl. ................260/75 T, 260/75 R, 264/328
[51] Int. Cl. .............................................C08q 17/04
[58] Field of Search ........................264/328; 260/75

[56] References Cited

UNITED STATES PATENTS

| 2,895,946 | 1/1959 | Huffman.......................260/75 |
| 3,048,565 | 8/1962 | Gall et al. ....................260/75 |
| 3,227,680 | 1/1966 | Tamblyn et al..............260/47 |
| 3,251,809 | 5/1966 | Lockwood et al...........260/75 |
| 3,361,848 | 1/1968 | Siggel et al. ................260/873 |
| 3,504,080 | 3/1970 | Siggel et al. ................264/235 |
| 3,516,957 | 6/1970 | Gray et al....................260/22 |

FOREIGN PATENTS OR APPLICATIONS 6,515,106   2/1967   Netherlands

Primary Examiner—Melvin Goldstein
Attorney—Cushman, Darby & Cushman

[57] ABSTRACT

Polyester moulding materials which can be injection moulded on a technical scale to give products having good mechanical properties are obtained by having present in the polyesterification mixture, besides a terephthalic or mainly terephthalic acid component and a diol component, 0.05–3 moles percent, on the acid component, of a compound containing at least 3, preferably 3 or 4, ester-forming groups this may for example be a tri- or tetra-carboxylic acid, a triol or tetrol, or a hydroxy carboxylic acid containing in all 3 or more ester-forming groups.

4 Claims, No Drawings

INJECTION MOLDED BRANCHED POLYESTERS

This is a division of our copending application, Ser. No. 717,415, filed Mar. 29, 1968 and now abandoned.

Polyester moulding materials which can be injection moulded on a technical scale to give products having good mechanical properties are obtained by having present in the poly-esterification mixture, besides a terephthalic or mainly terephthalic acid component and a diol component, 0.05-3 moles percent, on the acid component, of a compound containing at least 3, preferably 3 or 4, ester-forming groups; this may for example be a tri- or tetra-carboxylic acid, a triol or tetrol, or a hydroxy carboxylic acid containing in all 3 or more ester-forming groups.

When polymers which may exist in amorphous, crystalline and intermediate forms, such as polyesters for example, are employed for moulding, it is often desirable for the polymer in the moulded object to have a high degree of crystallinity, because the mechanical properties of a crystallized product are generally better than those of the same product in the amorphous state. Moreover, mould release of a crystallized article generally takes place more readily than with an amorphous article.

In addition, it is difficult to employ a shaped object obtained from such polymers in the amorphous state, because subsequent crystallization may occur under the action of various stresses of a mechanical, chemical or thermal nature. Such crystallization generally occurs heterogeneously and brings about local variations in properties, which set up internal stresses detrimental to the properties of the object as a whole.

By reason of these phenomena, ethylene polyterephthalate, although easy to bring into the form of filaments or films, is used for moulding only with difficulty. For this latter application, a certain number of conditions must be observed. Thus it is necessary: (1) To effect nucleation, which permits of reducing the induction period for crystallization and in addition prevents the formation of large crystallites which are responsible for subsequent fragility of the moulded articles, (2) To operate in a fairly strongly heated mould, the second order transition point of the polyester being about 80° C. and the rate of crystallization becoming appreciable only at about 140° C., and (3) To plasticize the polymer with the object of accelerating the crystallization in order to obtain acceptable moulding rates.

Despite these precautions, it remains difficult to mould complicated articles correctly and the residence time in the mould has to be long, more than one minute.

These disadvantages may be avoided by employing polyesters derived from terephthalic acid and from diols containing more than two carbon atoms, because the second order transition points of these polymers are low and their rate of crystallization high at moderate temperatures.

Of these polymers, trimethylene, tetramethylene and hexamethylene polyterephthalate are particularly interesting by reason of the ready availability of the starting materials. However these polymers give moulded articles whose shock resistance is insufficient for many applications.

It is an object of the present invention to provide moulding materials which can readily be shaped in the molten state and which also give moulded objects having good mechanical properties.

The moulding materials of the invention comprise essentially a polyester of specific viscosity (measured at 25° C. on a 1 percent by weight solution in ortho-chlorophenol) above 0.5, the acid component of the said polyester being essentially aromatic and at least 75 mole percent thereof being terephthalic acid, and the diol component being essentially a polymethylene diol with three to 10 carbon atoms in the molecule, the polyester comprising also units providing cross-linking sites and derived from 0.05-3 mole percent, reckoned on the acid, of at least one compound having at least 3 ester-forming groups.

The invention includes also the moulding of these materials in the molten state, and moulded objects obtained thereby. Those objects have high shock resistance and high rigidity.

It will be understood that the term "acid component" as employed herein does not include within its scope the compound providing cross-linking sites even when this contains an acid group or groups. When the acid compound comprises less than 100 percent of terephthalic acid, the remainder may be for example isophthalic acid, p,p'-dicarboxydiphenylmethane or another aromatic dicarboxylic acid.

The diols from which the polyesters are obtained are of the formula $OH(CH_2)_nOH$, n being an integer from three to 10 inclusive. The preferred polyesters are prepared from trimethylene-, tetramethylene- or hexamethylene-glycol.

The polyfunctional compounds which may be employed in accordance with the invention preferably contain three or four ester-forming groups. There may be mentioned more particularly tricarboxylic acids, such as trimesic acid, and tetracarboxylic acids, such as pyromellic acid, and their derivatives, triols, such as trimethylolpropane, tetrols, such as pentaerythritol, dihydroxy carboxylic acids and hydroxy dicarboxylic acids.

The proportion of compound comprising at least three groups capable of forming ester linkages is between 0.05 and 3 moles per hundred moles of diacid constituent (i.e. mole percent). In the case of trifunctional compounds, quantities between 0.1 and 2.5 mole percent are preferably employed, and in the case of tetrafunctional compounds from 0.1 to 1 mole percent. Compounds containing more than four reactive functions, although they may be employed in accordance with the invention, are more difficult to use.

If more than 3 mole percent of tri- or polyfunctional compound is used the products obtained can in practice be shaped only in solution and used only as coatings or coverings.

The polyester component is preferably prepared from a lower alkyl ester of terephthalic acid and more particularly from dimethyl terephthalate. Ester interchange is effected between this ester and the diol, in the presence of the compound comprising more than two ester-forming groups, whereafter the product is subjected to polycondensation. The ester interchange and polycondensation reactions are carried out by processes and in the presence of catalysts known per se.

The mouldable materials of the invention may contain organic fillers, such as phenolphthalein or crystalline polymers of high melting point, or mineral fillers such as titanium dioxide, silica, carbon black or magnesium silicate. These substances, provided they are finely divided and homogeneously distributed in the polymer, favor regular crystallization in the form of spherulites of small dimensions, which further improves the shock resistance of the moulded articles. Fibrous fillers may also be employed, for example organic synthetic fibers, metal fibers or glass fibers.

The moulding materials of the invention are shaped in the molten state; they are particularly suited to injection moulding, permitting very high moulding rates with unheated moulds.

The moulded objects of the invention have excellent mechanical properties, especially high shock resistance and high rigidity. These properties are only very slightly affected by conditions of moisture and are much less modified by a rise in temperature than those of ethylene polyterephthalate.

The invention illustrated in the following examples, which are given by way of indication and have no limiting character.

In these examples, the specific viscosity of the polymers is measured at 25° C. on a 1 percent by weight solution in ortho-chlorophenol, and the melt viscosity is determined at 285° C. in accordance with the ASTMD standard 1238–62T, condition K. "Parts" are by weight.

EXAMPLE 1

Into a stainless steel reactor heated by passing a mixture of diphenyl and phenyl oxide through a jacket, and provided with a stirrer, an evacuating device and the usual control and regulating means, are simultaneously charged in the cold:

| | |
|---|---|
| 22.7 moles of dimethyl terephthalate | 440 parts |
| 28.7 moles of butane-1,4-diol | 259 parts |
| 0.02 mole of dimethyl hydroxy-terephthalate | 0.475 part |
| 0.01 mole of butyl ortho-titanate | 0.484 part. |

The ester interchange commences at about 135° C. under normal pressure. After 2 hours the temperature of the mass reaches 250° C. and the theoretical quantity of methanol has distilled off. The pressure is then gradually reduced over 1 hour 10 minutes to 2,600 baryes. After polycondensation has continued for 1 hour further the temperature of the mass reaches 265° C. and the power absorbed by the stirrer ceases to increase substantially. The polymer is then cast.

The polymer obtained has the following properties:

| | |
|---|---|
| Specific viscosity | 1.27 |
| Melt viscosity | 920 Po. |

EXAMPLE 2

Into the stainless steel reactor are simultaneously charged:

| | |
|---|---|
| 22.7 moles of dimethyl terephthalate | 440 parts |
| 28.7 moles of butane-1,4-diol | 259 parts |
| 0.05 mole of trimethyl trimesate | 1.145 parts |
| 0.01 mole of butyl ortho-titanate | 0.484 part. |

The ester interchange commences at about 135° C. After heating for 2 hours, the temperature of the mass reaches 250° C. and the theoretical quantity of methanol has distilled off. The pressure is then brought to 2,600 baryes in 1 hour 10 minutes. After polycondensation for 1 hour further at 265° C., the polymer is cast.

Its properties are:

| | |
|---|---|
| Specific viscosity | 1.32 |
| Melt viscosity | 1230 Po. |

EXAMPLE 3

Into the stainless steel reactor are simultaneously charged:

| | |
|---|---|
| 15 moles of dimethyl terephthalate | 291 parts |
| 19 moles of butane-1,4-diol | 171 parts |
| 0.02 mole of pentaerythritol | 0.306 part 0.009 |
| 0.009 mole of butyl ortho-titanate | 0.32 part. |

The ester interchange commences at about 150° C.; after about 1 hour 55 minutes, the theoretical quantity of methanol has distilled off and the temperature of the mass reaches 250° C. The pressure is gradually brought to 2,600 baryes in 1 hour 10 minutes. After polycondensation for 55 minutes at 265° C., the polymer is cast.

Its properties are:

| | |
|---|---|
| Specific viscosity | 1.44 |
| Melt viscosity | 1900 Po. |

EXAMPLE 4

Into the stainless steel reactor are simultaneously charged:

| | |
|---|---|
| 15 moles of dimethyl terephthalate | 291 parts |
| 19 moles of butane-1,4-diol | 171 parts |
| 0.06 mole of trimethylolpropane | 0.804 part |
| 0.009 mole of butyl ortho-titanate | 0.32 part. |

The ester interchange commences at about 155° C.; after about 1 hour 55 minutes, the theoretical quantity of methanol has distilled off, and the temperature of the mass reaches 250° C. The pressure is gradually brought to 2,600 baryes in 1 hour 10 minutes. After polycondensation for 50 minutes at 265° C., the polymer is cast.

Its properties are:

| | |
|---|---|
| Specific viscosity | 1.39 |
| Melt viscosity | 7000 Po. |

EXAMPLE 5

There are introduced into a stainless steel agitated autoclave provided with control and regulating devices:

| | |
|---|---|
| 20 moles of dimethyl terephthalate | 3,880 parts |
| 25 moles of butane-1,4-diol | 2,250 parts |
| 0.05 mole of pentaerythritol | 6.8 parts |
| litharge | 7 parts |
| $Sb_2O_3$ | 2.3 parts. |

The ester interchange commences at 160° C. and lasts 2 hours 10 minutes.

The pressure is then gradually reduced over two hours to 2,600 baryes, the temperature reaching 260° C. The polycondensation is continued for 1 hour 20 minutes, and the polymer is cast, at 262° C.

Its properties are:

| | |
|---|---|
| Specific viscosity | 1.12 |
| Melt viscosity | 2200 Po. |

EXAMPLE 6

Into a stainless steel reactor as in Example 1 are simultaneously charged:

| | |
|---|---|
| 14 moles of dimethyl terephthalate | 271 parts |
| 18 moles of hexane-1,6-diol | 212 parts |
| 0.11 mole of trimethylolpropane | 1.5 part |
| 0.009 mole of butyl ortho-titanate | 0.3 part. |

The ester interchange commences at about 145° C. and ends at about 250° C. A vacuum of 800 baryes is gradually applied over 1 hour 5 minutes. After polycondensation for 1 hour 3 minutes, a temperature of 275° C. is reached and the polymer is cast.

Its properties are:

| | |
|---|---|
| Specific viscosity | 1.09 |
| Melt viscosity | 420 Po. |

The polymers of the preceding Examples, and control polymers prepared under the same conditions but without the polyfunctional compound, were moulded in a screw-type press, DK 60 brand, into notched shock test pieces measuring 4 × 6 × 60 mm.

The moulding conditions of application were:

| | |
|---|---|
| Temperature at the head of the screw | 245°C. |
| Temperature at the middle of the screw | 245°C. |
| Temperature at the rear of the screw | 245°C. |
| Temperature of the nozzle | 230°C. |
| Temperature of the mould | 60°C. |
| Injection time | 15 seconds |
| Cooling time in the mould | 5 seconds |
| Opening and closing times | 2 seconds |
| Total duration of the cycle/22 seconds | |

One hundred test pieces of each batch were moulded. Immediately before the tests, all the test pieces were heated at 140°C. for 1 hour, this heating having the object of creating an artificial aging in order to eliminate any differences which may exist between the first and last moulded batches. These test pieces were examined in accordance with the DIN standard No. 53,453.

The results are given in Table I.

TABLE I

| | Nature | Proportion of trifunctional compound | Specific viscosity | Impact strength kg-cm/cm$^2$ | Energy of fracture kg-cm |
|---|---|---|---|---|---|
| Control specimen | 6 GT $m_1$ | 0 | 1.01 | 4.6 | 0.78 |
| Ex. 6 | 6 GT | 0.8% | 1.09 | 7.8 | 1.25 |
| Control specimen | 4 GT $m_2$ | 0 | 1.25 | 4.1 | 0.70 |
| Ex. 1 | 4 GT | 0.1% | 1.27 | 5.1 | 0.86 |
| Ex. 2 | 4 GT | 0.2% | 1.32 | 5.9 | 1.0 |

$m_1$: hexamethylene polyterephthalate
$m_2$: tetramethylene polyterephthalate

These measurements were made with a Charpy striker carried on a pendulum (ZWICK brand) of 5 kg-cm., at 25° C., hydrometric state 0.

Under identical working conditions, parallelepipedic test pieces measuring 4 × 6 × 60 mm., based upon tetramethylene polyterephthalate with or without trifunctional linkages, were moulded.

These test pieces were subjected to a test identical to that described in the DIN standard 53,452, except that the two supports were 48 mm apart, which gives for the ratio $La/h$ a value of 12 instead of 10 in the standard.

All the measurements were made at 25° C., hydrometric state 0, on a horizontal AMSLER dynamometer 200 kg., type 02 ZH 118.

The following values were obtained:

TABLE II

| Proportion of trifunctional compound | Specific viscosity | Maximum stress for the external fibers (kg/mm$^2$) | Maximum deflection mm. |
|---|---|---|---|
| 0 | 1.31 | 8.5 | 7 |
| 0.1% | 1.27 | 8.6 | 7.2 |
| 0.2% | 1.32 | 8.7 | 7 |
| 0.3% | 1.45 | 9 | 7 |

These values show that polymers according to this application have high rigidity combined with high shock resistance.

EXAMPLE 7

A polymer based upon terephthalic acid and butane-1,4-diol containing 2 trifunctional linkages to 1,000 units is obtained under the conditions described in Example 2 and is brought into the form of parallelepipedic granules measuring 4 × 4 × 2 mm.

These granules are disposed in an enclosed space heated at 220° C. under a pressure of 250 baryes for 5 hours. Stirring is effected by means of a central helical stirrer. The specific viscosity changes from 1.32 to 1.87 in the course of the operation.

EXAMPLE 8

A polymer based upon terephthalic acid and butanediol containing 6 trifunctional linkages to 1,000 units is prepared under conditions similar to those of Examples 1, 2 and 4, and is brought into the form of granules measuring 4 × 4 × 2 mm.

These granules are disposed in an enclosed space heated at 220° C., and the latter is purged with nitrogen under atmospheric pressure at a rate of flow of 15 liters per minute. The nitrogen has previously been freed from any trace of oxygen and moisture and preheated to 220° C.

The operation lasts 5 hours and the specific viscosity of the polymer changes from 1.09 to 1.79.

As before, postcondensed non-modified polymers, and modified polymers, also postcondensed, are moulded in a screw-type press, brand DK 60, in the form of notched shock test pieces measuring 4 × 6 × 60 mm. in order to compare the impact strength (DIN standard No. 53,453).

The moulding conditions are:

| | |
|---|---|
| Temperature at the head of the screw | 270°C. |
| Temperature at the middle of the screw | 270°C. |
| Temperature at the rear of the screw | 270°C. |
| Temperature of the nozzle | 240°C. |
| Temperature of the mould | 60°C. |
| Injection time | 15 seconds |
| Cooling time | 8 seconds |
| Opening and closing times | 2 seconds |

Duration of the cycle            25 seconds

One hundred test pieces of each batch were placed on a CHARPY striker carried on a pendulum, ZWICK brand, of 5 kg/cm., after having previously been heated for 1 hour at 140° C.

Other test pieces were subjected to the test derived from the DIN standard 53,452 described in the preceding examples. The following results were obtained:

TABLE III

| Proportion of trifunctional compound | Duration of postcondensation | Specific viscosity | Impact strength kg-cm/cm$^2$ | Maximum stresses for the external fibers (kg/mm$^2$) |
|---|---|---|---|---|
| 0 | 5 hours | 1.45 | 5.9 | 9.1 |
| 0.2% | 5 hours | 1.84 | 8.1 | 9.6 |
| 0.3% | 1 hour | 1.38 | 6.1 | 9.8 |
| 0.3 | 3 hours | 1.51 | 7.5 | 10 |
| 0.6% | 5 hours | 1.79 | 8.75 | 10.2 |

Comparison of the results set out in this Table with those of Table I and Table II show:

1. That it is possible according to the invention to obtain the same shock resistance in an unmodified polymer postcondensed for 5 hours in the solid state, and 2. That, for an identical postcondensation, the shock resistance of the polymers of the invention is much greater than that of an unmodified polymer.

We claim:

1. A molded article having a basis of a polyester and obtained by injection molding a material consisting essentially of a polyester of specific viscosity (measured at 25° C on a 1 percent by weight solution in o-chlorophenol) above 0.5, the acid component of the ester structural units of said polyester being essentially aromatic and comprising 75–100 mol percent of terephthalic acid, and the diol component of at least 97 percent of such units being a polymethylene diol having three to 10 carbon atoms in the molecule, which polyester contains also, as the only additional structural units, 0.05 to 3 mol percent of structural units being derived from a tricarboxylic acid, a tetracarboxylic acid, a triol, a tetrol, a dihydroxycarboxylic acid or a hydroxydicarboxylic acid which units provide branching and cross-linking points.

2. A molded article according to claim 1, in which the diol component is selected from trimethylene glycol, tetramethylene glycol, and hexamethylene glycol, and the additional structural units are derived from trimesic acid, pyromellitic acid, trimethylolpropane, pentaerythritol or hydroxyterephthalic acid.

3. A molded article according to claim 1 in which the polyester contains 0.1 to 2.5 mol percent of said additional structural units.

4. A molded article according to claim 2, in which the polyester contains 0.1 to 1 mol percent of said addition structural units.

* * * * *

UNITED STATES PATENT OFFICE
CERTIFICATE OF CORRECTION

PATENT NO. : 3,692,744
DATED : September 19, 1972
INVENTOR(S) : RENE PICH and YVES VAGINAY It is certified that error appears in the above—identified patent and that said Letters Patent are hereby corrected as shown below:

On the front page format, change the first inventor's name "Rich" to --Pich--.

Signed and Sealed this second Day of March 1976

[SEAL]

Attest:

RUTH C. MASON
*Attesting Officer*

C. MARSHALL DANN
*Commissioner of Patents and Trademarks*